(12) United States Patent
Doherty

(10) Patent No.: US 8,599,719 B1
(45) Date of Patent: Dec. 3, 2013

(54) DISCOVERY OF NEIGHBORS DURING WIRELESS NETWORK JOINING

(75) Inventor: Lance Robert Doherty, San Leandro, CA (US)

(73) Assignee: Dust Networks, Inc., Hayward, CA (US)

(*) Notice: Subject to any disclaimer, the term of this patent is extended or adjusted under 35 U.S.C. 154(b) by 409 days.

(21) Appl. No.: 12/770,565

(22) Filed: Apr. 29, 2010

Related U.S. Application Data (60) Provisional application No. 61/268,854, filed on Jun. 16, 2009.

(51) Int. Cl.
*H04L 12/28* (2006.01)

(52) U.S. Cl.
USPC .......................................................... 370/254

(58) Field of Classification Search
None
See application file for complete search history.

(56) References Cited

U.S. PATENT DOCUMENTS

| | | | |
|---|---|---|---|
| 7,706,337 B2* | 4/2010 | Pandey et al. | 370/338 |
| 7,957,356 B2* | 6/2011 | Wang et al. | 370/338 |
| 8,023,468 B2* | 9/2011 | Liu et al. | 370/331 |
| 2006/0089138 A1* | 4/2006 | Smith et al. | 455/426.1 |
| 2007/0014269 A1* | 1/2007 | Sherman et al. | 370/338 |
| 2007/0140163 A1* | 6/2007 | Meier et al. | 370/329 |
| 2008/0107090 A1* | 5/2008 | Thomson et al. | 370/338 |
| 2008/0201403 A1* | 8/2008 | Andersson et al. | 709/202 |
| 2008/0205340 A1* | 8/2008 | Meylan et al. | 370/331 |
| 2009/0046675 A1* | 2/2009 | Pratt et al. | 370/337 |
| 2009/0052382 A1* | 2/2009 | Stephenson et al. | 370/329 |
| 2009/0052429 A1* | 2/2009 | Pratt et al. | 370/350 |
| 2009/0296673 A1* | 12/2009 | Beach | 370/338 |
| 2010/0067428 A1* | 3/2010 | Cordeiro et al. | 370/315 |
| 2010/0115272 A1* | 5/2010 | Batta | 713/162 |
| 2010/0226344 A1* | 9/2010 | Nandagopalan | 370/338 |
| 2010/0279677 A1* | 11/2010 | Dwyer et al. | 455/422.1 |
| 2011/0205910 A1* | 8/2011 | Soomro et al. | 370/252 |

* cited by examiner

*Primary Examiner* — Dang Ton
*Assistant Examiner* — Ronald h Davis
(74) *Attorney, Agent, or Firm* — McDermott Will & Emery LLP (57) ABSTRACT

A system for discovering neighbors during wireless network joining comprises a first wireless network node and a second wireless network node. The first wireless network node listens for a message from a third wireless network node based at least in part on information received in a communication form the second wireless network node.

24 Claims, 8 Drawing Sheets

Fig. 8

DISCOVERY OF NEIGHBORS DURING WIRELESS NETWORK JOINING

CROSS REFERENCE TO OTHER APPLICATIONS

This application claims priority to U.S. Provisional Patent Application No. 61/268,854 entitled DISCOVERY OF NEIGHBORS DURING WIRELESS NETWORK JOINING filed Jun. 16, 2009 which is incorporated herein by reference for all purposes.

BACKGROUND OF THE INVENTION

Wireless networks are composed of a set of devices called wireless network nodes (or simply "nodes") that locally generate data and report this information wirelessly (e.g., with radio transmission) to their peers or a centralized management application. In some wireless network systems, communication among synchronized nodes is organized as a set of links, scheduled in time into a periodic communications superframe. This type of organized communication scheme can save power by minimizing the total time each node needs to have its transmitter and receiver powered on while still ensuring reliable data transfer and hopping over different communication channels. Overlaying superframes can be designed for different communication needs (e.g., system startup, normal operation, node diagnostics, emergency alarm propagation), and nodes can individually switch various superframes on and off as necessary. One application of a superframe is to schedule advertising packet transmissions from all nodes in the networks to give new nodes an opportunity to discover potential neighbors in the network. After discovering one or more neighbors, a new node can join the network.

A new node typically turns on its receiver to a random channel and listens for advertisement packets that may be transmitted in its vicinity. Once it has successfully received an advertisement packet, it can synchronize itself to the network it is trying to join. In a slotted wireless communication system, after this synchronization, the joining node can listen more efficiently as its receiver need be active only during the times that packets could potentially be sent. However, the receiver must still listen on a random channel, and in an arbitrary situation, there is no upper bound on the amount of time that it takes the joining node to hear all of its potential neighbors transmit an advertisement packet. This is true even when joined nodes are transmitting at a bounded, periodic, rate. There is hence no guarantee that a joining node will know all of its neighbors after a joining timeout has elapsed.

In a centrally controlled wireless network, the centralized management application determines which neighbor relationships will serve as communication links as nodes report their potential neighbors during joining. The more elements reported by the joining node, and the more information is available on the quality of these neighbor paths, the better the decisions on communication links that can be made by the management application. Better initial decisions result in better network performance (e.g., lower latency of data packets generated by the nodes, lower average energy consumption of nodes, and shorter join times for new nodes).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Discovery of neighbors during wireless network joining is disclosed. A system for discovering neighbors comprises a first wireless network node and a second wireless network node. The first wireless network node listens for a message from a third wireless network node based at least in part on information received in a communication form the second wireless network node.

Consider the case where a first wireless network node is trying to join a wireless network comprising two or more other wireless network nodes (e.g., a second and third wireless network nodes). The first wireless network node listens asynchronously on random frequency channels searching for communications from the wireless network. In some embodiments, the first wireless network node listens for a message from a third wireless network node based on information (e.g., a time slot, a frequency, an algorithm for calculating a slot and/or frequency, etc.) received in a communication from the second wireless network node. In some embodiments, the communication from the second wireless network node allows the first wireless network node to add the second wireless network node to its neighbor list and provides information on how the first wireless network node can best listen for communications from other wireless network nodes. In some embodiments, the time and frequency channel of listening is dependent on information received during a communication with the second wireless network node. In some embodiments, hearing the third wireless network node allows the first wireless network node to augment its neighbor list. In some embodiments, the first wireless network node is joining the wireless network comprising the second and third wireless network nodes.

Communications intended for the explicit purpose of helping other wireless network nodes join the wireless network are known as advertisement packets. In some embodiments, the communication received by the first wireless network node comprises an advertisement packet. The advertisement packet from the second wireless network node contains information on how the first wireless network node can hear future advertisements from any other wireless network node currently joined to the network. In some embodiments, the wireless network is time synchronized. In some embodiments, the first wireless node has a clock source with enough accuracy to maintain time synchronization long enough to hear a packet from the third wireless node. In various embodiments, any advertisement packet is transmitted on an offset comprising the following: a constant offset or a non-constant deterministic function of the slot number, or any other appropriate offset. With the advertisement information, the first wireless node knows when and on which frequency channel to listen for any subsequent advertisements. In some embodiments, the first wireless network node can calculate the advertisement offset for any subsequent slot having heard a single advertisement.

In some embodiments, a wireless node joining a wireless network becomes synchronized to the network and discovers its potential neighbors by asynchronously receiving advertisement packets with its radio receiver.

Once the first wireless network node has heard a first advertisement packet, it has synchronized to the wireless network and discovered at least one potential neighbor node. In some embodiments, the first wireless node listens for a plurality of other wireless nodes. The first wireless node then has a list of neighbors from which it has heard communications and can send this list as a report in a packet to another device, e.g., a wireless network management application (the "manager"). In some embodiments, the first wireless network node generates a report of heard wireless network nodes and sends the report to a fourth wireless network node. The fourth wireless network node, or a device hooked up to it, then uses the information contained in the report to calculate the wireless connectivity of the first wireless network node. In some embodiments, the report is used to calculate new wireless connections for the network with the first wireless network node as one of the endpoints.

The first node to join the network, an access point node, is connected via wire to the manager. In some embodiments, a wireless network manager initiates the communication process using a wireless access point. The manager activates the access point(s) through a separate, wired protocol. This activation includes the assignment of a superframe and cells in the superframe to allow an access point to advertise. An access point advertisement seeds the wireless joining of the rest of the nodes in the network. In the case that the fourth wireless network node is an access point, the manager can assign wireless links to the first wireless network node to allow it to join the wireless network. In some embodiments, the fourth wireless network node comprises an access point. When the manager receives the report from the first wireless network node, potentially multiple wireless hops later, it sends an activation packet to the new node, routed through a neighboring existing node. Upon receipt of the response, the new node is configured and able to participate in the wireless network. A configured node is able to transmit advertisements of its own to aid in further joining of nodes to the network.

The report packet from the first wireless network node contains a list of potential neighbors from which the node heard advertisements. The manager chooses from this list of nodes one or more neighbors by which to add the new node to the network. A larger list of nodes, as well as estimates of the quality of the wireless paths between the new node and these potential neighbors, improves the performance of the joining process.

Nodes transmit and receive wirelessly in a time-synchronized wireless network according to schedules given to them by the manager. The periodic communication opportunities are encoded in a superframe which instructs the node which timeslot and channel offset to use for each transaction. Each time-synchronized network maintains a counter on the number of timeslots elapsed since the beginning of the network. The manager selects a list of allowed transmission channels (frequencies), and each node is given this list as part of the joining process. Knowing this list, each node has the ability to compute the transmission channel at any time given a channel offset and the total number of timeslots elapsed.

In a typical network, few, if any, nodes will be in communication range of all other nodes. Even when the sender and receiver are in range, synchronized, and agree on the frequency channel to be used for the transaction, there remains a finite chance that the packet will not be successfully received. Wireless networks are designed to function in the continuous presence of packet errors. The wireless channel between two nodes is called a path, and the fraction of packets that succeed on this path is the path stability.

Advertisement packets are scheduled to be sent periodically using a repeating superframe structure. During the joining process, the manager assigns at least one advertisement opportunity per superframe for each node that is permitted to solicit new nodes as neighbors. In some embodiments, the plurality of other wireless network nodes are guaranteed to communicate once per superframe length. In previous implementations, advertisements are scheduled on randomly selected timeslots and channel offsets. In order for a joining node to hear advertisements in these implementations, it must randomly select the proper frequency channel on which to listen. If there are several allowed frequency channels in the network, the probability of hearing an advertisement will be low. This is the case regardless of whether or not a joining node has previously synchronized to the network by hearing one or more advertisements. When communications are scheduled to appear on a calculated offset, the first wireless node can hear them with a greater probability and can listen for a bounded amount of time. In some embodiments, the first wireless network node listens to the calculated offset for a superframe length to hear all wireless network nodes in its vicinity.

In some embodiments, the advertisement opportunities are scheduled on random timeslots while channel offsets are assigned according to a deterministic pattern known in advance to joining nodes. In some embodiments, this deterministic pattern is one where all advertisements are assigned to a constant channel offset. This deterministic pattern does not exclude the advertisements from sequentially being transmitted on all available frequency channels as the number of elapsed timeslots will increase while the offset remains the same. Mappings exist such that full channel coverage is guaranteed using a single offset.

In some embodiments, the manager assigns no more than one advertisement per timeslot. As such, no more than one node will transmit an advertisement anywhere in the network during a single timeslot. In some embodiments, at most one advertisement packet is transmitted in the wireless network in a single timeslot.

In some embodiments, each node already in the network is assigned exactly one advertisement opportunity per superframe by the manager. In some embodiments, each node sends an advertisement packet at every opportunity. A node with one advertisement opportunity per superframe sending an advertisement at every opportunity advertises exactly once per superframe. In some embodiments, all advertisement communications are scheduled on the same superframe. In some embodiments, advertisement communications are scheduled on a plurality of superframes. In the case that there are multiple superframes on which advertisement communications occur, the first wireless network node listens for one or more of the advertisements with the longest superframe length.

In some embodiments, as a joining node hears its first advertisement, it learns of the total elapsed timeslot count for the network and the allowed list of channel frequencies. Based on this information, it can predict the channel frequency on which an advertisement would be sent during the following timeslot, and all subsequent timeslots.

In some embodiments, all nodes in the network will send one advertisement packet per superframe on a deterministic frequency channel. A joining node in this embodiment can listen to the appropriate deterministic frequency channel during each slot to have an opportunity to hear each potential neighbor. In the case of perfect packet reception from all potential neighbors, the joining node hears one advertisement from all potential neighbors in one superframe.

In some embodiments, the first wireless network node listens to the calculated offset for multiple superframe lengths to measure the path stability to one or more or all of the wireless network nodes in its vicinity. In some embodiments, the first wireless network node keeps a count of the number of communications heard from each neighbor node. After multiple superframes, the joining node has not only a list of potential neighbors, but also a measure of the path stability to each potential neighbor. The joining node sends this list, along with the estimated path stability, to the manager as part of the joining process.

In some embodiments, once all the nodes have joined, the manager has a list of all potential neighbors in the network and an estimate of the path stability for each pairwise path. Even though each path has two endpoints, the path will be reported by the node joining later as nodes do not begin advertising until after they have joined. Nodes are linked to other nodes, meaning they share a transactional opportunity, only if the manager is aware of an adequately high quality path between them. In some embodiments, the network manager uses the information reported by the first wireless network node to choose the best connections into the network.

Figure 1:
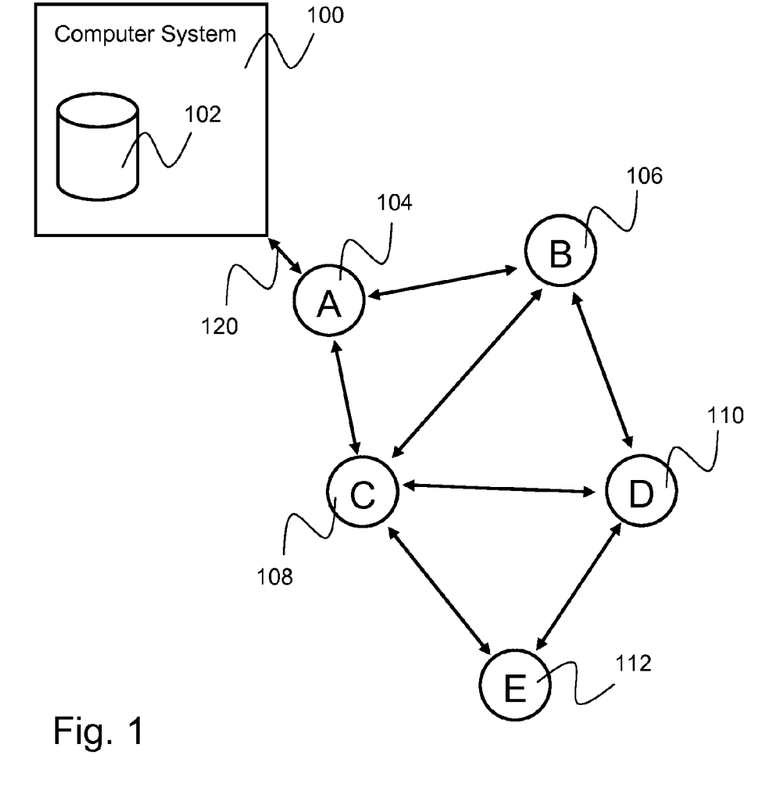
FIG. 1 is a block diagram illustrating an embodiment of a wireless network.

FIG. 1 is a block diagram illustrating an embodiment of a wireless network. In the example shown, the wireless network comprises node 104, node 106, node 108, node 110, node 112, and computer system 100. Computer system 100 communicates with access point node 104 via connection 120. In various embodiments, connection 120 is a wired connection, a wireless connection, a local area network, a wide area network, the Internet, or any other appropriate network. In some embodiments, access point node 104 is one of a plurality of access point nodes. In some embodiments, computer system 100 is capable of processing data sent to it through the wireless network. Computer system 100 includes storage 102.

In the example shown, node 104 is linked to nodes 106 and 108. Node 106 is linked to node 104, node 108, and node 110. Node 108 is linked to node 104, node 106, node 112, and node 110. Node 110 is linked to node 106, node 108, and node 112. Node 112 is linked to node 108 and node 110. In some embodiments, the nodes communicate using radio frequencies that are in the 900-930 MHz or 2.45 GHz industrial, scientific, and medical (ISM) radio band. In some embodiments, the wireless network is compatible with IEEE standard 802.15.4. The IEEE 802.15.4 standard relates to low rate wireless personal area networks. In some embodiments, the ability of nodes to link is partly determined by their physical distance from one another and partly by physical obstructions between them.

Figure 2:
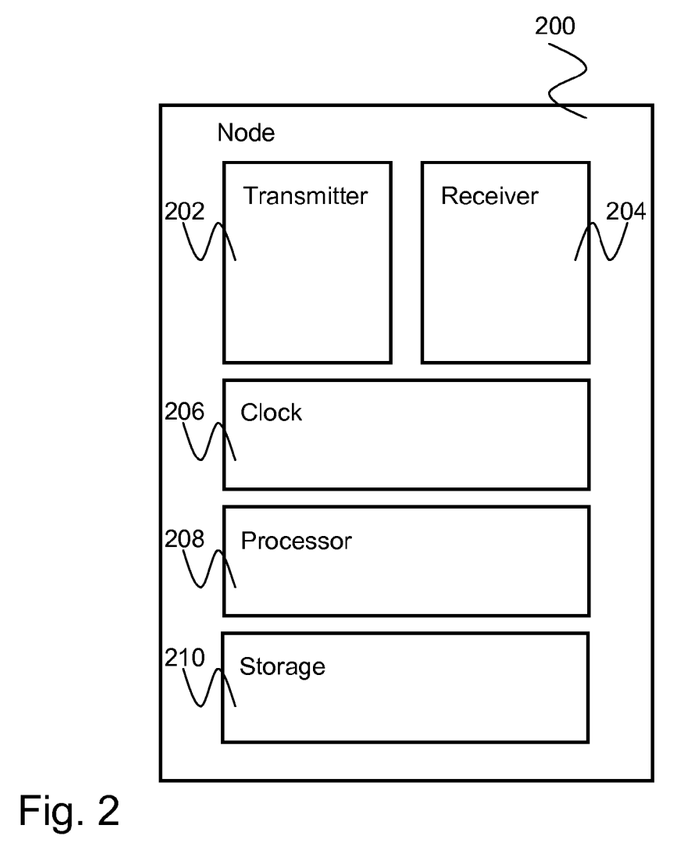
FIG. 2 is a block diagram illustrating an embodiment of a node.

FIG. 2 is a block diagram illustrating an embodiment of a node. In some embodiments, node 200 of FIG. 2 is part of a wireless network (e.g., node 104, node 106, node 108, node 110, and/or node 112 of the wireless network of FIG. 1). In the example shown, node 200 comprises transmitter 202, receiver 204, clock 206, processor 208, and storage 210. Transmitter 202 and receiver 204 enable node 200 to communicate with other nodes and/or with other systems that include transmitters and/or receivers. In various embodiments, transmitter 202 and/or receiver 204 communicate using frequency modulated signals, phase modulated signals, amplitude modulated signals, time division multiplexing signals, code division multiplexing signals, signals compliant with the Institute of Electrical and Electronics Engineers (IEEE) 802.11 standard, signals compliant with the Institute of Electrical and Electronics Engineers (IEEE) 802.15.4 standard, signals according to the Bluetooth protocol, signals according to the ultra wide bandwidth (UWB) approach, or signals encoded using any other appropriate scheme. In various embodiments, transmitter 202 and/or receiver 204 communicate in the medium frequency band, the high frequency band, the very high frequency band, the ultra high frequency band, or any other appropriate frequency band. In some embodiments, transmitter 202 and receiver 204 communicate using the industrial, scientific, and medical (ISM) bands (e.g., 902-928 MHz, 2.400-2.500 GHz, 5.725-5.875 GHz, etc.). In some embodiments, transmitter 202 and/or receiver 204 can switch between a low bandwidth/low power consumption mode and a high bandwidth/high power consumption mode to enable low power use during normal operation, but allow for high bandwidth transmission when necessary. In some embodiments, node 200 includes a battery and is designed to require infrequent battery replacement (e.g., a low power node that has a battery change once a month, once a few months, once a year, once every few years, etc. depending on the application). In some embodiments, node 200 includes systems designed to gather and store energy from the environment (e.g., light energy from the sun or other light energy sources, mechanical energy from vibration of the node, or any other appropriate environmental energy source).

Figure 3:
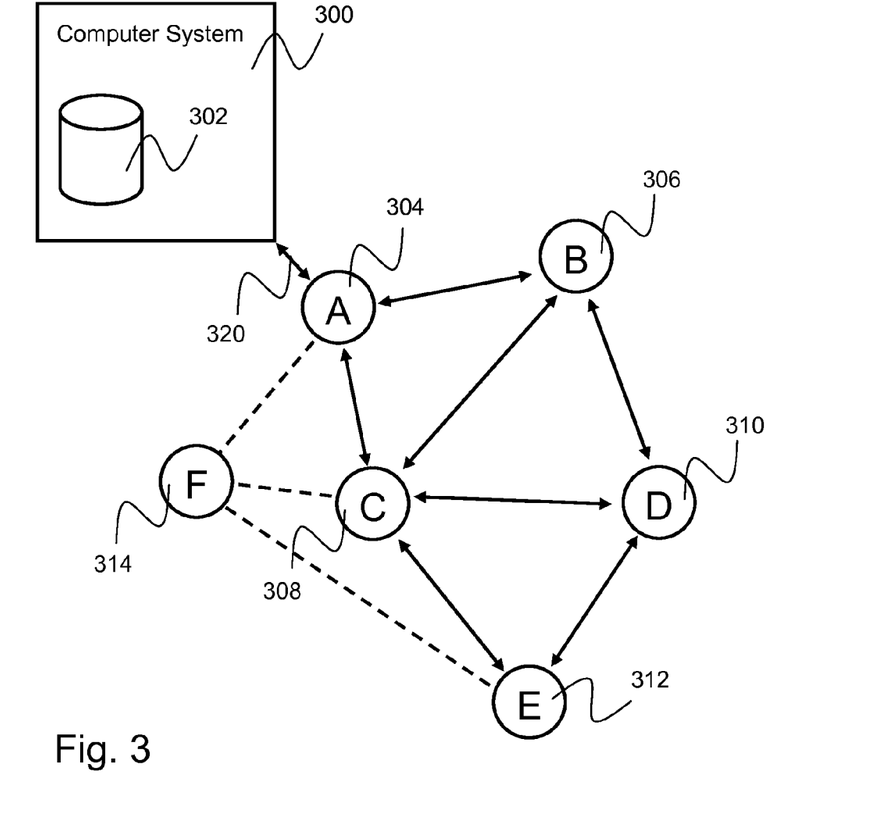
FIG. 3 is a block diagram illustrating an embodiment of a new node joining an existing wireless network.

FIG. 3 is a block diagram illustrating an embodiment of a new node joining an existing wireless network. In the example shown, the wireless network comprises node 304, node 306, node 308, node 310, node 312, and computer system 300. Computer system 300 communicates with access point node 304 via connection 320. In various embodiments, connection 320 is a wired connection, a wireless connection, a local area network, a wide area network, the Internet, or any other appropriate network. In some embodiments, access point node 304 is one of a plurality of access point nodes. In some embodiments, computer system 300 is capable of processing data sent to it through the wireless network. Computer system 300 includes storage 302.

In the example shown, node 304 is linked to nodes 306 and 308. Node 306 is linked to node 304, node 308, and node 310. Node 308 is linked to node 304, node 306, Node 312, and node 310. Node 310 is linked to node 306, node 308, and node 312. Node 312 is linked to node 308 and node 310. A new node, node 314 listens asynchronously for advertisement packets from the joined nodes in the network (e.g., node 304, node 306, node 308, node 310, and node 312). In this example, node 314 has the potential neighbor list comprising node 304, node 308, and node 312. Providing node 314 listens for long enough, it will hear advertisement packets from each of these potential neighbors.

Figure 4:
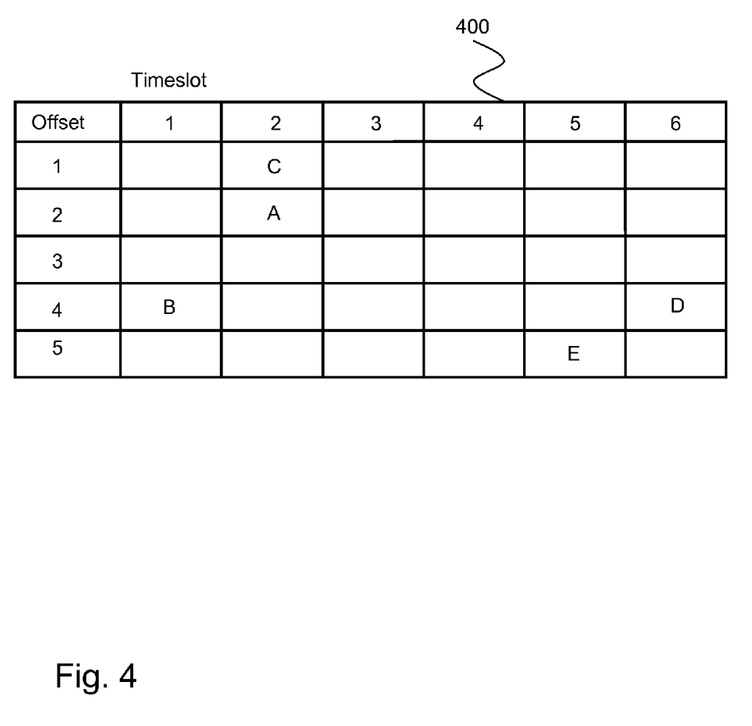
FIG. 4 is a diagram illustrating an embodiment of a communications superframe for a time-synchronized wireless network with random advertisement offset selection.

FIG. 4 is a diagram illustrating an embodiment of a communications superframe for a time-synchronized wireless network with random advertisement offset selection. In the example shown, each joined node from FIG. 3 is assigned one advertisement opportunity per superframe 400. Time in a time-synchronized wireless network is broken into synchronized units called "timeslots" which are long enough for one transaction to occur. An advertisement is an example of one transaction, and superframe 400 is a representation of the repeating, 6-timeslot, global advertising schedule for the network. The advertising opportunities are represented by cells in the table filled in with the letter representing a node name (e.g., a node name corresponding to a node in FIG. 3). In general, each node is assigned an advertisement opportunity on a random channel offset and timeslot. There may be more than one assignment network-wide per timeslot, as illustrated by timeslot 2, during which a new node (e.g., node 314 in FIG. 3) with a single receiver can hear no more than one.

The set of occupied cells in FIG. 4 describes which node is potentially transmitting an advertisement packet in each timeslot. For timeslot 1 and channel offset 4, node B has the opportunity to advertise. For timeslot 2, node C has the opportunity to advertise on channel offset 1 and node A has the opportunity to advertise on channel offset 2. For timeslot 5, node E has the opportunity to advertise on channel offset 5. For timeslot 6, node D has the opportunity to advertise on channel offset 4.

In various embodiments, each channel in a frame corresponds to a predetermined transmission frequency, to a pseudo randomly permuted transmission frequency, to a transmission frequency changing according to a predetermined schedule, or to a frequency determined in any other appropriate way. Each node is hardcoded with this channel offset-to-frequency mapping prior to deployment.

Figure 5:
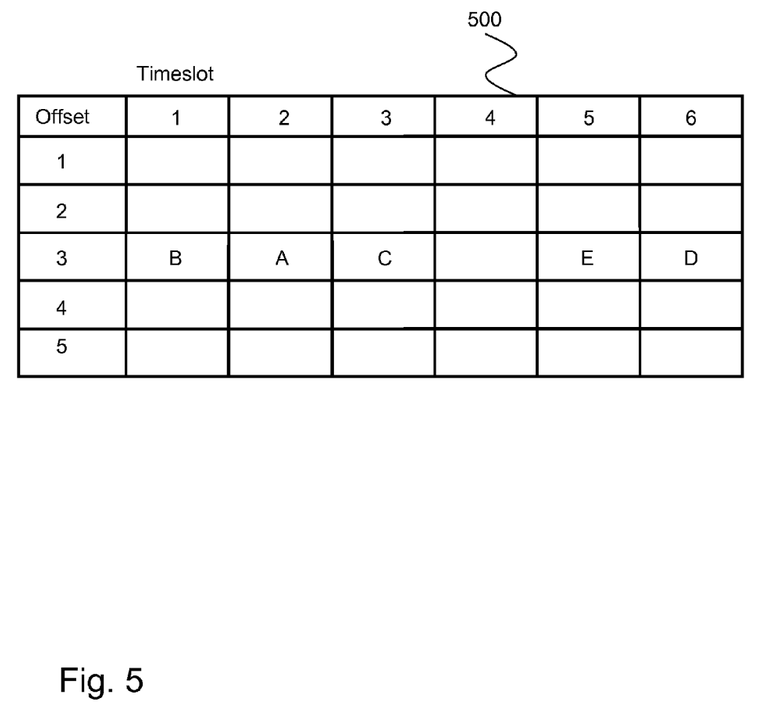
FIG. 5 is a diagram illustrating an embodiment of a communications superframe for a time-synchronized wireless network with constant advertisement offset selection.

FIG. 5 is a diagram illustrating an embodiment of a communications superframe for a time-synchronized wireless network with constant advertisement offset selection. In the example shown, the same set of nodes from FIG. 4 is again assigned a single advertising opportunity per 6-timeslot superframe. Joined nodes using the superframe 500 transmit advertisements no more frequently than those using the superframe 400 of FIG. 4. However, only a single channel offset, offset 3, is populated in superframe 500. In timeslots 1, 2, 3, 5, and 6, nodes B, A, C, E, and D, respectively, have the opportunity to advertise on channel offset 3. A new node (e.g., node 314 in FIG. 3) could potentially hear all these advertisements in the six timeslots by always listening to channel offset 3.

Figure 6:
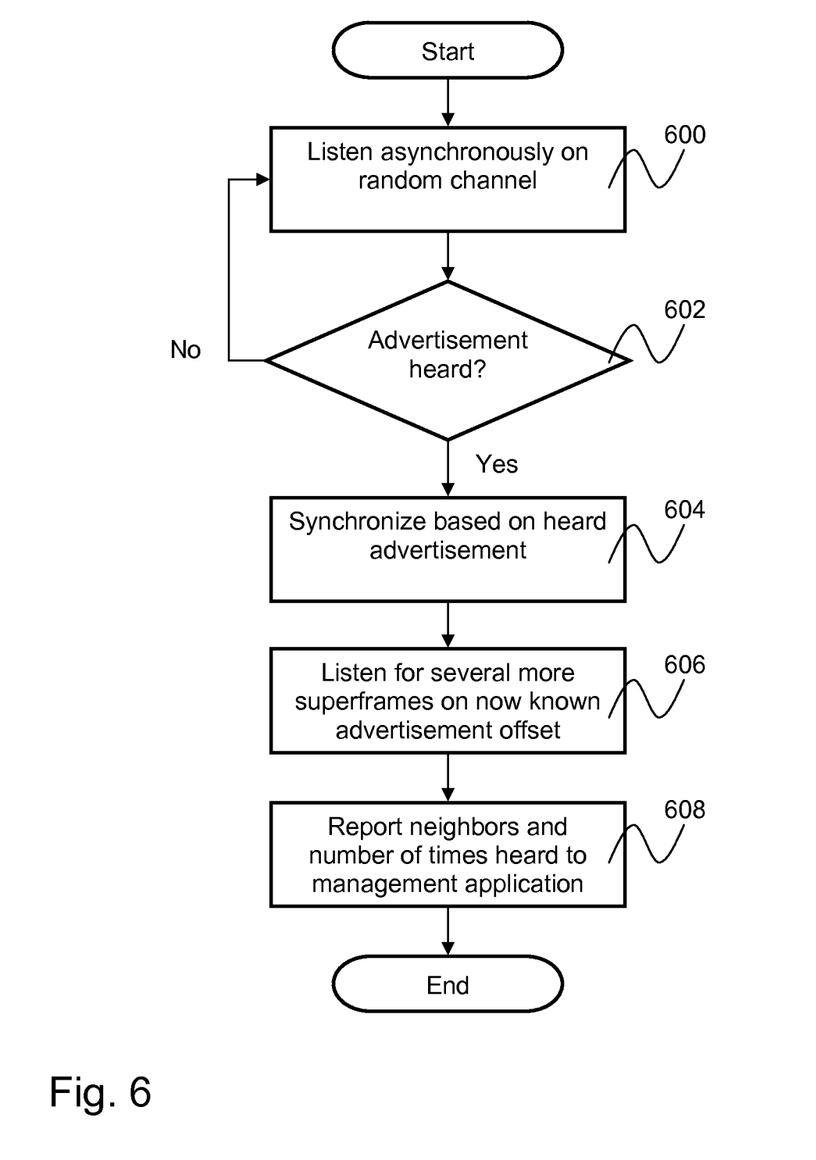
FIG. 6 is a flow diagram illustrating an embodiment of a process followed by a new mote to join a wireless network.

FIG. 6 is a flow diagram illustrating an embodiment of a process followed by a new mote to join a wireless network. In the example shown, in 600, a node listens asynchronously on a random channel. For example, the joining node, or the new mote, listens for a pre-determined length of time, which exceeds the length of an advertisement transmission, on a randomly selected frequency channel. In 602, it is determined whether an advertisement is heard. In the event that an advertisement is not heard, control passes to 600. For example, the node repeats its asynchronous listening on a different random channel. In the event that an advertisement is heard, in 604 the node synchronizes based on the advertisement that was heard. In 606, the node listens for several more superframes on a now known advertisement offset. For example, the mote listens to discover all advertising neighbors. In 608, the node reports its neighbors and the number of times heard to a management application. For example, the mote joins the network by reporting a list of neighbors and a count of how many advertisements were heard from each. Then the process terminates.

In some embodiments, the manager will not have used a single offset for advertisements. In this case, the new node will exit the asynchronous listening stage at the same time but may not hear as many neighbors during the synchronized listening interval. The new node will join with a subset of the full neighbor list reported and the manager will join this node as is done in the prior art with no impediment. The mote state machine does not inhibit functionality when operating in a system not using the disclosed technique.

In some embodiments, the manager selects a deterministic way for choosing a single offset for advertisements in any given slot. For example, the manager chooses to use offset m for advertisements in even slots and offset/for advertisements in odd slots, and m≠l. In some embodiments, a representation of this choosing method is contained in the advertisements sent by nodes already in the network and heard by new nodes joining the network. Nodes hearing these advertisements learn of the method chosen and listen on the appropriate advertisement offsets in subsequent slots to be guaranteed to hear all potential neighbors.

Figure 7:
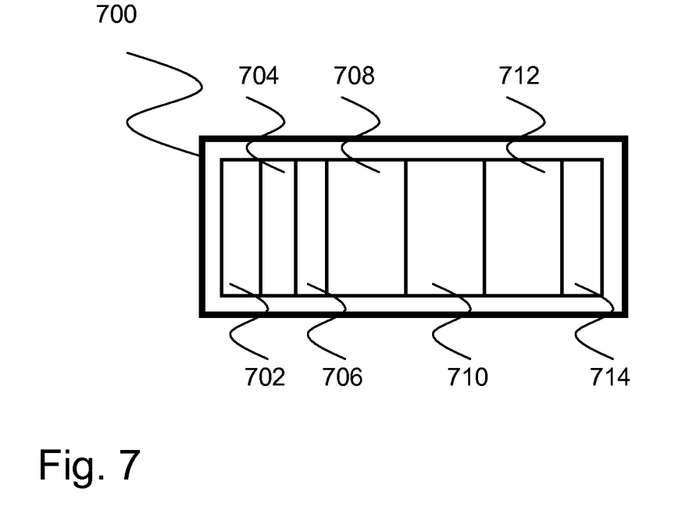
FIG. 7 is a block diagram illustrating an embodiment of an advertisement packet.

FIG. 7 is a block diagram illustrating an embodiment of an advertisement packet. In the example shown, advertisement packet 700 includes preamble 702, start-of-frame delimiter (SFD) 704, packet length 706, timeslot number 708, channel bitmap 710, other advertisement information 712, and checksum 714. Preamble 702 comprises a sequence of bits for synchronizing a clock for reading the remainder of the packet. SFD 704 comprises a sequence of bits indicating the start of the information portion of advertisement packet 700. Packet length 706 comprises a series of bits from which the length of the packet can be determined. Timeslot number 708 tells the new mote which timeslot the network is currently at to perform the calculation of which offset is being used. Channel bitmap 710 provides the new mote with a transformation to use to determine which channel frequency to listen to for each subsequent timeslot. The other advertisement information 712 tells the new node when it can send in its join packet along with some superframe information. Checksum 714 is calculated using a cyclic redundancy check (CRC) operating packet 700, and is used to determine whether packet 700 has been received without error. In some embodiments, advertisement packet 700 is compliant with Institute of Electrical and Electronics Engineers (IEEE) 802.15.4 standard. Advertisement packet 700 when transmitted from a radio transceiver is transmitted as information encoded in binary form as chips. In various embodiments, chips have a one-to-one correspondence with data bits; data bits are encoded into chips using a chipping sequence; data bits are first encoded into symbols, and the symbols are mapped into a chip sequence, or any other appropriate mapping between chips and data bits.

In various embodiments, a timestamp corresponds to a time associated with a start of a start-of-frame delimiter, an end of a start-of-frame delimiter, a center of a start-of-frame delimiter, a start of a preamble, an end of a preamble, a center of a preamble, a start of a packet length field, an end of a packet length field, a center of a packet length field, a start of a checksum, an end of a checksum, a center of a checksum, a start of a payload byte, an end of a payload byte, a center of a payload byte, a start of a payload bit, an end of a payload bit, or a center of a payload bit, or any other appropriate received data bit, byte, chip, or any other appropriate portion of a packet.

Figure 8:
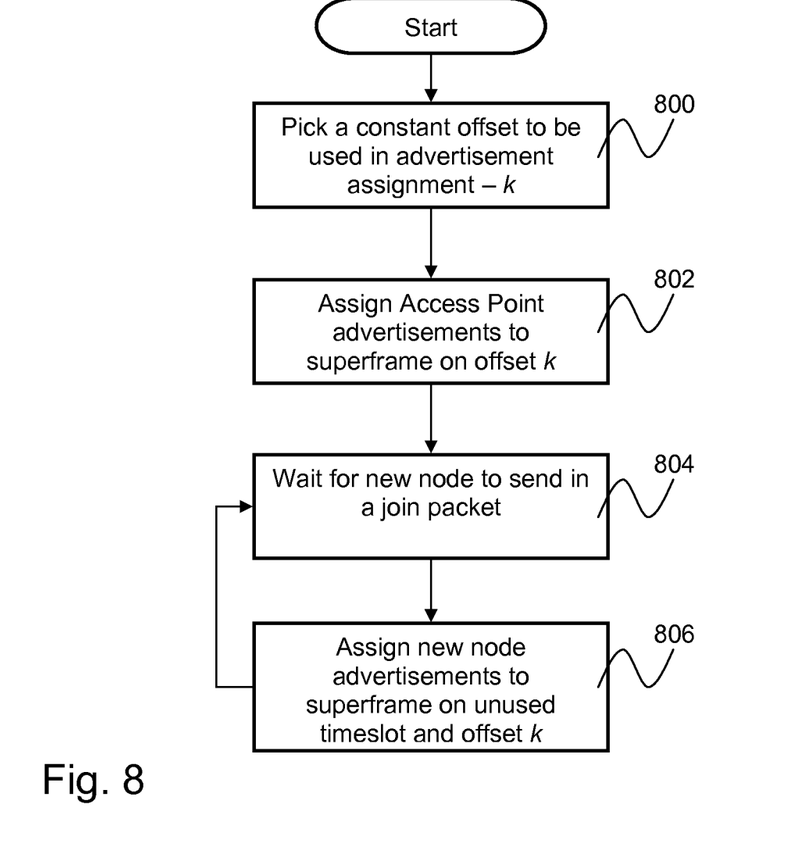
FIG. 8 is a flow diagram illustrating an embodiment of a process followed by a network management application to assign advertising offsets to all nodes in a wireless network.

FIG. 8 is a flow diagram illustrating an embodiment of a process followed by a manager to assign advertising offsets to all nodes in a wireless network. In the example shown, the process starts when the first access point sends in a join message. In 800, a constant offset is picked to be used in an advertisement assignment. For example, the manager selects the constant offset k that will be used for all advertisements in the network. In 802, an access point advertisement is assigned to superframe on offset k. For example, the manager assigns advertisements to a superframe on the access point on offset k. In 804, the process waits for a new node to send in a join packet. For example, the new node sends a join packet to arrive at the manager. In 806, new node advertisements are assigned to superframes on unused timeslot and offset k. For example, the manager assigns advertisements to a superframe on the new node on offset k. The process continues for the remaining life of the network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a first wireless network node;
a second wireless network node; and
a third wireless network node,
wherein the first, second, and third wireless network nodes are part of a plurality of wireless network nodes,
wherein the first wireless network node is configured to:
listen for a communication from the third wireless network node, wherein the listening is performed based at least in part on information received in a communication from the second wireless network node;
receive, in at least one of the communication from the second wireless network node and the communication from the third wireless network node, information indicative of a time to send a join packet for enabling the first wireless network node to join a wireless network; and
in response to receiving the communication from the third wireless network node, generate a join packet for enabling the first wireless network node to join the wireless network and transmit the join packet at the indicated time to send the join packet, and
wherein the join packet generated and transmitted by the first wireless network node includes a report identifying neighboring wireless network nodes from which the first wireless network node has received communications and including a measure of path stability to each neighboring wireless network node.

2. A system as in claim 1, wherein a time and a frequency channel of listening is dependent on information received during the communication with the second wireless network node.

3. A system as in claim 1, wherein hearing the third wireless network node allows the first wireless network node to augment its neighbor list.

4. A system as in claim 1, wherein the first wireless network node is joining a wireless network comprising the second wireless network node and the third wireless network node.

5. A system as in claim 1, wherein the communications comprise advertisement packets.

6. A system as in claim 5, wherein the advertisement packet is transmitted on one of a constant offset or a non-constant offset determined based on a deterministic function of a slot number.

7. A system as in claim 6, wherein the first wireless network node calculates the offset for any subsequent slot having heard the advertisement packet.

8. A system as in claim 6, wherein the advertisement packet is one of a plurality of advertisement packets, wherein all of the plurality of advertisement packets are scheduled on a single superframe.

9. A system as in claim 6, wherein the packet is one of a plurality of advertisement packets, wherein the plurality of advertisement packets are scheduled on a plurality of superframes.

10. A system as in claim 5, wherein at most one advertisement packet is transmitted in a single timeslot.

11. A system as in claim 1, wherein the first wireless network node is further configured to listen for communications from network nodes of the plurality of wireless network nodes other than the second and third wireless network nodes.

12. A system as in claim 11, wherein the first wireless network node transmits the join packet to a fourth wireless network node other than the second or third wireless network node from which the information indicative of a time to send the join packet was received.

13. A system as in claim 12, wherein the report is used to calculate new wireless connections for a wireless network with the first wireless network node as an endpoint of the wireless network.

14. A system as in claim 12, wherein the fourth wireless network node comprises an access point.

15. A system as in claim 11, wherein the plurality of other wireless network nodes are guaranteed to communicate once per superframe length.

16. A system as in claim 15, wherein the first wireless network node listens to a calculated offset for a superframe length to hear one of the wireless network nodes in its vicinity.

17. A system as in claim 1, wherein the first wireless network node listens to a calculated offset for multiple superframe lengths to measure the path stability to each one of the neighboring wireless network nodes in its vicinity.

18. A system as in claim 1, wherein a wireless network manager initiates the communications using a wireless access point.

19. A system as in claim 18, wherein the network manager uses information reported by the first wireless network node to choose one or more best connections into the network.

20. A system as in claim 1, wherein the first wireless network node is further configured to:

identify a list of neighboring nodes to the first wireless network node based on the received communications from the second and third wireless networks nodes.

21. A system as in claim 20, wherein the first wireless network node is further configured to:
   count a number of communications received from each of the second and third wireless network nodes,
   wherein the generating and transmitting of the join packet comprises generating and transmitting the join packet including the count of the number of communications received from each of the second and third wireless network nodes.

22. A system as in claim 1, wherein the first wireless network node is further configured to:
   in response to transmitting the join packet, receiving an assignment of a timeslot and an offset of a superframe for the first wireless network node to transmit advertisement packets during the assigned timeslot on the assigned offset of the superframe.

23. A system as in claim 22, wherein:
   the join packet generated and transmitted by the first wireless network node is addressed to a manager of the wireless network including the second and third wireless network nodes; and
   the assignment of the timeslot and of the offset of the superframe is received by the first wireless network node from the manager of the wireless network.

24. A method comprising:
   receiving information at a first wireless network node in a communication from a second wireless network node;
   listening at the first wireless network node for a communication from a third wireless network node, wherein the listening is performed based at least in part on the information received in the communication from the second wireless network node;
   receiving, in at least one of the communication from the second wireless network node and the communication from the third wireless network node, information indicative of a time to send a join packet for enabling the first wireless network node to join a wireless network; and
   in response to receiving the communication from the third wireless network node, generating a join packet for enabling the first wireless network node to join the wireless network and transmitting the join packet at the indicated time to send the join packet,
   wherein the join packet generated and transmitted by the first wireless network node includes a report identifying neighboring wireless network nodes from which the first wireless network node has received communications and including a measure of path stability to each neighboring wireless network node.

* * * * *